Dec. 26, 1950 S. VAN MIERLO 2,535,104

SELECTIVE SIGNALING EQUIPMENT ONLY OPERATIVE BY TWO-VOICE FREQUENCIES

Filed Feb. 4, 1947

INVENTOR.
STANISLAS VAN MIERLO
BY
Robert Harding Jr.
ATTORNEY

Patented Dec. 26, 1950 2,535,104

UNITED STATES PATENT OFFICE 2,535,104

SELECTIVE SIGNALING EQUIPMENT ONLY OPERATIVE BY TWO-VOICE FREQUENCIES

Stanislas Van Mierlo, Antwerp, Belgium, assignor to International Standard Electric Corporation, New York, N. Y., a corporation of Delaware Application February 4, 1947, Serial No. 726,379
In Switzerland December 26, 1944

9 Claims. (Cl. 179—84)

Figure 1:
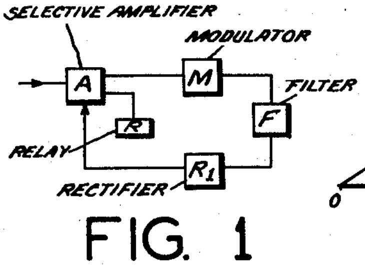

This invention relates to voice frequency signalling systems. A signalling equipment is a device, used for example on telephone lines, for the transmission of varied signals intended to produce at a distance certain operations such as a call, a change in a circuit, the selection of a line, etc.

Voice-frequency signalling equipments used in telephone circuits must, in general, meet the following conditions:

1. They must not operate on voice currents or on interference currents capable of being produced by the line and resulting from induction or from signals that are not intended for the signalling equipment.

2. Conversely, the operation of the signalling equipment must not, in so far as possible, be interfered with by such currents nor by harmonics capable of being produced in the amplifier forming part of the signalling equipment.

3. The signals to be transmitted must suffer only a slight deformation with respect to their duration, both when the strength of the line currents is of normal value as well as when their strength varies a certain amount from normal.

4. The currents used to cause the signalling equipment to operate must be chosen in the band of frequencies transmitted by the line with an acceptable and sufficiently constant attenuation.

5. The strength of the signalling currents must be relatively low with respect to the strength of the voice currents.

6. The signalling equipment must increase the attenuation of the line only the very least amount.

7. The signalling equipment must be a device that is as simple as possible, stable, easy to maintain and not requiring delicate adjustments.

In order to meet the first condition, it has been proposed to make use, for signalling, of relatively high frequencies, above 2000 cycles for example, because the strength of such frequencies forming part of the voice spectrum is very low and thus almost always incapable of causing the signalling equipment to operate.

It has also been proposed to use two frequencies so that the signalling equipment will operate only if the two frequencies are received at the same time, the probability of these two frequencies being present at the same time in the voice spectrum being very slight.

The main feature of the invention comprises a voice frequency signalling equipment characterised by an amplifier almost completely blocked at rest, so as to amplify selectively the two frequencies that, in passing through a modulator and a rectifier, unblock the amplifier and thus cause the operation of a relay.

In this invention, use is made of the second of the above principles, but at the same time the first may also be used. Furthermore, the modulator gives a supplementary protection, because it is necessary that both frequencies have a minimum value in order for the unblocking to be produced effectively. This means that if the voice spectrum by chance comprises both frequencies chosen, it is still necessary that both be of a strength suitable to produce operation of the signalling equipment.

Moreover, if necessary, use may be made of protecting circuits operated by the frequencies present in the voice spectrum and that, in this case, prevent the unblocking of the amplifier. But this involves complications and it is thought that it is not generally necessary to provide such protecting circuits where use is made of two frequencies for signalling.

It is to be noted that, preferably, the alternating currents from the amplifier forming part of the signalling equipment do not serve in this invention to operate a relay, but merely to modify the bias of a grid. The elements of the circuit through which these currents pass can thus be of small dimensions and an appreciable loss of energy may be permitted. On the other hand, the modulator may be of a very simple type and it is not necessary to feed the two frequencies separately to it. All this tends to make possible a solution that meets the condition of simplicity.

Embodiments of the object of the invention will be set forth in the following description, given with reference to the attached drawing.

Figure 4:
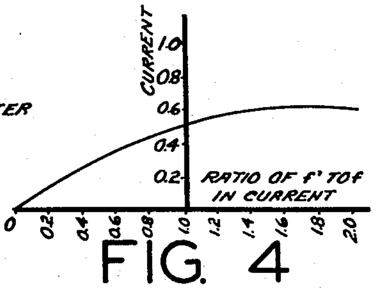
Figure 2:
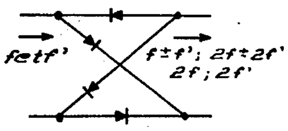
Figures 3, 5, 6, 7, 8:
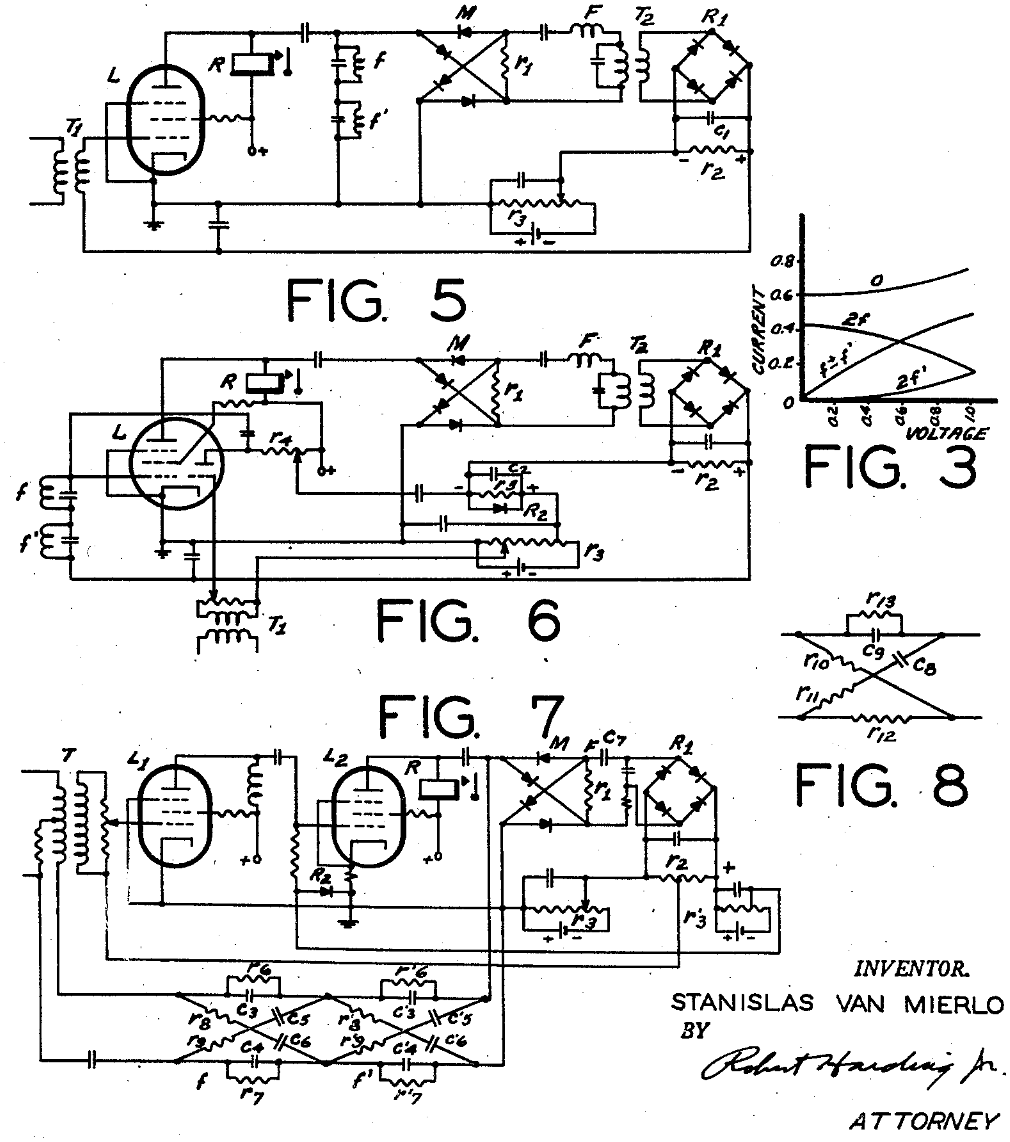

The various figures of the drawing show:

Figure 1 a general diagram of the signalling equipment;

Figure 2 a diagram of one of the contemplated modulators;

Figure 3 curves indicating the relative strength of the currents from the modulator;

Figure 4 a curve indicating the relative strength of the output frequency from the modulator as a function of the ratio of the strengths of the two signalling frequencies;

Figure 5 an example of a signalling equipment circuit having two resonant circuits;

Figure 6 an example of a signalling equipment circuit having two resonant circuits and a device for preventing the distortion of the signals obtained when the signalling current changes in strength;

Figure 7 an example of a signalling equipment circuit with two bridges having resistances and condensers; and Figure 8 a diagram of a simplified bridge having resistances and condensers.

The general arrangement of the signalling equipment in accordance with this invention is shown in Figure 1. The line currents reach a selective amplifier A, which normally is substantially blocked and thus furnishes only a very weak current. The currents having the signalling frequencies pass to modulator M and produce a series of modulation frequencies. Only the current whose frequency is equal to the difference of the two signalling frequencies passes through filter F and is rectified by rectifier $R_1$. The direct voltage is then applied to the amplifier in order to unblock it so as to allow it to cause relay R to operate.

Selective amplifier A may be of one of the known types, making use of resonant circuits, or of bridges having resistances and condensers, these selection elements being included if need be, in a reverse-feedback circuit. There may be provided either a single circuit adjusted for a frequency equal to or approximating the average of the two signalling frequencies or use may be made of two attenuation or resonance circuits adjusted to select frequencies corresponding to these two frequencies. Other known types of selective amplifiers may also be used.

Where the selective amplifier supplies both frequencies at the same time, use will be made for example of a modulator comprising 4 rectifiers, as shown in Figure 2. In accordance with the well-known theory, if currents $f$ and $f'$ are applied to this modulator at the same time, a current output is obtained therefrom that comprises the following frequencies;

$$0, f \pm f', 2f, 2f', 2f \pm 2f', \text{etc.}$$

The relative strength of these currents is shown in Figure 3 where the rectifiers may be considered as linear, i. e. when the current is substantially proportional to the voltage. This is not always the case in practice, but the curves nevertheless give a good idea of the respective value of the products of modulation. It is realized that it is quite easy to eliminate all the components except $f-f'$. Figure 4 shows approximately the variation in strength of this current as a function of the ratio of the strength of $f'$ to that of $f$. Thus, it is seen that, even if one of the currents of frequency $f$ or $f'$ is quite strong, the current of frequency $f-f'$ remains relatively weak if the other current, $f'$ or $f$ is weak.

Figure 5 shows an example of a circuit embodying the general arrangement of Figure 1.

With the aid of potentiometer $r_3$, the control grid of pentode L is given a voltage sufficiently negative so that the plate current will be almost zero. Thus, relay R does not operate. If the signals of frequency $f$ and $f'$ arrive through transformer $T_1$, a weak current may pass to modulator M, since each of the parallel tuned circuits which are connected in series across the input to the modulator is tuned to resonate respectively at the signalling frequency $f$ or $f'$ and therefore each tuned circuit presents a maximum impedance at its respective resonant frequency. Other frequencies would be tuned out and effectively short-circuited. The output frequency components furnished by the modulator as discussed with reference to Fig. 2 pass through resistance $r_1$, and only frequency $f-f'$ passes through filter F combined with transformer $T_2$. This latter will be used when the necessary voltage is not obtained directly. Rectifier $R_1$ produces a direct current in resistance $r_2$, and the difference in potential of this latter is subtracted from the negative voltage furnished by potentiometer $r_3$. The control grid of tube L becomes less negative and the plate current will be able to reach a strength sufficient to operate relay R. The condenser $c_1$ that shunts resistance $r_2$ will be of relatively small capacity so as to reduce to a very small value, less than 1 millisecond for example, the time constant of this resistance and condenser assembly.

Where the operating time of relay R exceeds a few milliseconds, as is the case of the ordinary relays used in telephony, this circuit has the drawback of modifying the length of the signalling pulses when the strength of the signal received through the signalling equipment increases or decreases from its normal value. In effect, since resonant circuits $f$ and $f'$ must have a substantially weak damping so as to eliminate the other frequencies in so far as possible, the building-up and dying-down time is quite long. The relay current thus starts and stops only gradually and the slope of this current during the transient periods depends on the strength of the signals. It follows from this that the period between the beginning of the signal and the closing of the contact, on the one hand, and between the end of the signal and the opening of the contact, on the other hand, also varies with the strength of the signals. In order to prevent such a distortion of signals, it is necessary to introduce a correction.

Figure 6 shows an example of a circuit comprising such a correction and at the same time capable of operating with weaker signals than those that would be necessary in the circuit of Figure 5. In Figure 6, tube L comprises a pentode and a triode with a common cathode. The signal passing through transformer $T_1$ is received by the grid of the triode. The plate current of the latter then comprises an alternating current whose strength depends on the amplitude of the signal. Now, this alternating current passes in part across resistance $r_4$ connected to rectifier $R_2$ and thus produces a mean voltage at the terminals of resistance $r_5$, which is added to the fixed negative bias given by potentiometer $r_3$. The combined value of the voltages of $r_3$ and $r_5$ then varies with the strength of the signals. For a strong signal, the control grid of the pentode will have a more negative value than for a weak signal. Thus, with an appropriate adjustment, a constant amplitude of the plate current of the pentode may be maintained to a certain degree.

Relay R will then reproduce the pulses in a substantially uniform manner. Instead of making this correction with the aid of a triode, a portion of the signalling current may be rectified directly, if need be, if its strength is sufficient. The length of the pulses may be controlled by modifying the potential furnished by $r_3$ and by choosing an appropriate adjustment for relay R.

The time constant of $r_5$ and of its condenser $c_2$ may be so chosen as to introduce a supplementary protection against improper operation of relay R by the voice currents. In effect, if these currents are momentarily of very great strength, they may produce improper operation if they contained frequencies in the neighbourhood of $f$ and $f'$. But in this case the negative potential furnished by $r_5$ would increase and would make the tube less sensitive and this condition of insensitivity would still be maintained for a few seconds, because of the time constant of $r_5$ and of its condenser $c_2$, even if the voice strength had lessened slightly. If relay R operates at such a point in the voice current, the operating time will be limited and may be made too short to be harmful.

Figure 7 shows, by way of example, a reverse-feedback selective amplifier using bridges $f$ and $f'$ having condensers $c_3$ to $c_6$ and $c'_3$ to $c'_6$ respectively, and resistances $r_6$ to $r_9$ and $r'_6$ to $r'_9$ respectively, which are adjusted to pass the signalling frequencies. The attenuation of these bridges is practically infinite for the corresponding $f$ and $f'$ frequencies and hence the reverse feedback is zero. Thus a good selectivity is obtained with a rather great amplification of the amplifying portion of the circuit. In this figure, a low pass filter F comprising a resistance $r_1$ and a condenser $c_7$ has been used. It will be noted that the constant negative bias voltage is furnished by two potentiometers $r_3$ and $r'_3$. This is provided for the case where tube $L_2$ requires a voltage greater than that of tube $L_1$. Likewise, the total voltage furnished by $r_2$ is applied to $L_2$, while only a portion thereof is furnished to $L_1$. Moreover, one could limit oneself to effecting the adjustment of tube $L_1$ only. If necessary, the correction arrangement shown in Figure 6 may be added.

It is clear that the reverse-feedback voltage may be injected in a manner other than that shown in Figure 7. In this figure, one notices furthermore rectifier $R_2$, which prevents an overloading of tube $L_2$, in the case of very strong signals. The grid potential can never become zero.

In Figures 5, 6, and 7 a selective circuit has been provided for each of the two signalling frequencies. But if these two frequencies are very close to each other, it is possible to make use of only a single circuit adjusted to the frequency $$\frac{f+f'}{2}$$

for example, hence allowing the two $f$ and $f'$ frequencies to pass at the same time. One may, for example, choose a value of 100 for $f-f'$. Taking a value much less than 100 is not to be recommended, since this would produce too great a distortion of pulses, the unblocking potential then not having a sufficiently rectangular shape.

The fact that only a single selective circuit is required greatly simplifies the circuit in Figure 7. Two pentodes have been provided so as to obtain a good selectivity in spite of the great attenuation of the $f$ and $f'$ bridges connected in series. Where a single bridge is used, it may be sufficient to use only a single tube. If need be, by sacrificing selectivity somewhat, a simplified bridge, as shown in Figure 8, comprising resistors $r_{10}$ to $r_{13}$ and the condensers $c_8$ and $c_9$ could also be used.

Having now particularly described and ascertained the nature of said invention and in what manner the same is to be performed, I declare that what I claim is:

1. Voice frequency signaling equipment comprising an amplifying circuit having an amplifier element therein, means for normally maintaining said amplifier element in a low condition of conduction, means for simultaneously applying to the input of said amplifier element, when in said low condition of conduction, incoming signals having different frequencies therein, frequency selective means in the said amplifying circuit for selecting a predetermined plurality of said different frequency signals, a modulator in the output of said amplifying circuit for intermodulating the plurality of selected signal frequencies, means responsive to the output of said modulator for changing said amplifier element from said low condition of conduction to a high condition of conduction, and signal operative means in the output of said amplifying circuit means whereby said signal operative means is responsive to the output of said amplifier element only during the operation of said element in said high condition of conduction.

2. Voice frequency signaling equipment comprising an amplifying circuit having an amplifier element therein, means for normally maintaining said amplifier element in a low conductive state, means for simultaneously applying to the input of said amplifier element when in said low conductive state incoming signals having different frequencies therein, frequency selective means in the said amplifying circuit for selecting a predetermined plurality of said different frequency signals, a modulator in the output of said amplifying circuit for intermodulating the plurality of selected signal frequencies, a rectifier connected to the output of said modulator being operative to rectify a predetermined voltage from said modulator in response to said modulated signals, circuit means connected to said rectifier for feeding said predetermined rectified voltage back to said amplifier element, said voltage being operative to change said amplifier element from said low conductive state to a high conductive state and a relay in the output of said amplifying circuit means whereby said relay is responsive to the output of said amplifier element only during operation of said element in said low conductive state.

3. A signaling equipment, according to claim 2, and further comprising circuit means connected in said amplifying circuit being operative to prevent distortion of the signals upon variations in the strength of the currents received.

4. A signaling equipment, according to claim 2, in which the frequency selective means is tuned to frequencies chosen in the upper portion of the voice-frequency band.

5. A signaling equipment, according to claim 2, in which frequency selective means is tuned to two frequencies.

6. A signaling equipment, according to claim 2, in which the frequency selective means is adjusted to pass two frequencies and means is provided for applying both frequencies together to the modulator.

7. A signaling equipment, according to claim 2, in which protective means is provided in the feed back circuit to prevent the unblocking of the amplifier for short periods of time.

8. A signaling equipment, according to claim 3, in which the correction device includes means for preventing untimely operation by currents other than signaling currents.

9. A signaling equipment, according to claim 2, in which the frequency selective means comprises a bridge network having resistances and condensers.

STANISLAS VAN MIERLO.

REFERENCES CITED

The following references are of record in the file of this patent:

UNITED STATES PATENTS

| Number | Name | Date |
|---|---|---|
| 2,141,944 | Thompson | Dec. 27, 1938 |
| 2,145,053 | Meszar | Jan. 24, 1939 |
| 2,255,190 | Ryall | Sept. 9, 1941 |
| 2,293,869 | Vaughan | Aug. 25, 1942 |
| 2,418,116 | Grieg | Apr. 1, 1947 |

Certificate of Correction

Patent No. 2,535,104 December 26, 1950

STANISLAS VAN MIERLO

It is hereby certified that error appears in the above numbered patent requiring correction as follows:

In the grant, line 16, strike out the words "of Seventeen years"; same line, after "grant" insert *until December 26, 1964*; in the heading to the printed specification, line 10, before "9 Claims" insert the following: *Section 1, Public Law 690, August 8, 1946. Patent expires December 26, 1964*;

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*